(12) United States Patent
Dinges (10) Patent No.: US 9,040,000 B2
(45) Date of Patent: May 26, 2015

(54) SAMPLE CONTAINER WITH SENSOR RECEPTACLE AND METHODS OF USE

(75) Inventor: Warren L. Dinges, Seattle, WA (US)

(73) Assignee: Heatflow Technologies Inc., Seattle, WA (US)

( * ) Notice: Subject to any disclaimer, the term of this patent is extended or adjusted under 35 U.S.C. 154(b) by 209 days.

(21) Appl. No.: 13/358,932

(22) Filed: Jan. 26, 2012

(65) Prior Publication Data
US 2013/0195139 A1    Aug. 1, 2013

(51) Int. Cl.
| | |
|---|---|
| *G01K 1/00* | (2006.01) |
| *B01L 3/00* | (2006.01) |
| *B01L 99/00* | (2010.01) |
| *B01L 3/14* | (2006.01) |
| *G01K 5/00* | (2006.01) |
| *G01K 9/00* | (2006.01) |
| *G01K 1/08* | (2006.01) |
| *G01K 7/00* | (2006.01) |
| *G01K 7/16* | (2006.01) |
| *B01L 7/00* | (2006.01) |

(52) U.S. Cl.
CPC ............... *B01L 3/50825* (2013.01); *B01L 7/52* (2013.01); *B01L 2200/141* (2013.01); *B01L 2200/147* (2013.01); *B01L 2300/042* (2013.01); *B01L 2300/047* (2013.01); *B01L 2300/0851* (2013.01); *B01L 2300/12* (2013.01)

(58) Field of Classification Search
USPC ........... 374/200, 209; 702/130, 132; 422/500, 422/547, 549, 551, 556
See application file for complete search history.

(56) References Cited

U.S. PATENT DOCUMENTS

| | | |
|---|---|---|
| 4,290,997 A | 9/1981 | Suovaniemi |
| 4,933,146 A | 6/1990 | Meyer et al. |
| 5,385,253 A | 1/1995 | Scharf et al. |
| 5,585,242 A | 12/1996 | Bouma et al. |
| 5,639,668 A | 6/1997 | Neel et al. |
| 5,846,489 A | 12/1998 | Bienhaus et al. |

(Continued)

FOREIGN PATENT DOCUMENTS

| | | |
|---|---|---|
| EP | 1516585 A1 | 3/2005 |
| EP | 2026069 A1 * | 2/2009 |

(Continued)

OTHER PUBLICATIONS

International Search Report and Written Opinion for PCT/US2013/023109, mailed on May 23, 2013, 11 pages.

*Primary Examiner* — Jill Warden
*Assistant Examiner* — Julie Tavares
(74) *Attorney, Agent, or Firm* — Cooley LLP (57) ABSTRACT

Devices and methods are described herein that are configured for use in laboratory testing, such as, for example, during a procedure including the monitoring and detection of chemical reactions. For example, the systems and devices described herein can be used during a procedure to monitor and detect polymerase chain reactions (PCR). In some embodiments, a sample container includes a container body that defines an interior volume and has an open end in fluid communication with the interior volume. A cap is sealingly engageable with the open end of the container body. The cap defines a receptacle that is configured to extend within a portion of the interior volume of the container body when the cap is sealingly engaged thereto. The receptacle can receive therein a sensor, such as, a temperature sensor that can monitor the temperature of a sample material disposed within the container body.

7 Claims, 11 Drawing Sheets

(56) References Cited

U.S. PATENT DOCUMENTS

| | | |
|---|---|---|
| 6,015,534 A | 1/2000 | Atwood |
| 6,435,710 B1 | 8/2002 | Fauske |
| 6,475,443 B1 | 11/2002 | van Deursen et al. |
| 2002/0086417 A1* | 7/2002 | Chen .......................... 435/287.3 |
| 2005/0065454 A1* | 3/2005 | Manoussakis ................ 600/576 |

FOREIGN PATENT DOCUMENTS

| | | |
|---|---|---|
| GB | 2333250 A * | 7/1999 |
| WO | WO 03/031275 A1 | 4/2003 |
| WO | WO 2007/053870 A2 | 5/2007 |
| WO | WO 2007/138302 A1 | 6/2007 |
| WO | WO 2009/095178 A1 | 8/2009 |

* cited by examiner

SAMPLE CONTAINER WITH SENSOR RECEPTACLE AND METHODS OF USE

BACKGROUND

The invention relates generally to devices and methods for use in laboratory testing, such as, for example, in the monitoring and detection of Polymerase Chain Reactions (PCR).

Some known laboratory sample containers are constructed from materials that can sustain typical temperature variations associated with molecular biology laboratory procedures, chemical exposure to typical reagents, and structural stability to centrifuge forces. A lid or cap can be used to contain and seal a sample material disposed within the sample container. With such known sample containers, obtaining an accurate measurement of, for example, a temperature of the contents within the sample container can be challenging. For example, some known sample containers may have an opening in a lid to allow for a sensor to be disposed within the interior of the container and in contact with the sample material. In such containers, contamination of the sample material or the sensor can occur, or sensor readings can be affected by exposing the sample material to the environment outside of the sample container or from contact with the sensor. Some known sample containers rely on temperature measurements to be taken at a location on an exterior portion of the container. In some cases, such measurements may not reflect the temperature of the sample material to a level of accuracy desired or needed for a particular testing procedure being performed.

Thus, there is a need for improved sample containers that can allow for accurate measurements of the sample material to be obtained while maintaining the sample container in a sealed condition.

SUMMARY OF THE INVENTION

Devices and methods are described herein that are configured for use in laboratory testing, such as, for example, during a procedure including the monitoring and detection of chemical reactions. For example, the systems and devices described herein can be used during a procedure to monitor and detect polymerase chain reactions (PCR). In some embodiments, a sample container includes a container body that defines an interior volume and has an open end in fluid communication with the interior volume. A cap is sealingly engageable with the open end of the container body. The cap defines a receptacle that is configured to extend within a portion of the interior volume of the container body when the cap is sealingly engaged thereto. The receptacle can receive therein a sensor, such as a temperature sensor that can monitor the temperature of a sample material disposed within the container body.

DETAILED DESCRIPTION

Devices and methods are described herein that are configured for use in laboratory testing procedures, such as, for example, in a procedure to monitor and detect chemical reactions of a sample material. For example, the devices and methods described herein can be used in a procedure to monitor and detect polymerase chain reactions (PCR). The devices and methods described herein can allow for the monitoring of the temperature of a sample material disposed within a sample container without inserting a temperature sensor directly into the sample container. Known sample containers used for such laboratory testing typically require the sample container to be opened to allow for insertion of the temperature sensor into the sample material or to measure a surface temperature of the sample container.

A sample container described herein can include at least one receptacle or recess in the lid or cap, in the bottom of the container body, or both to allow a temperature probe to be inserted into thermal contact with the bulk contents of the sample container without coming into direct physical contact with the contents. The wall of the receptacle can prevent contamination of a sensor (e.g., temperature probe) inserted therein, but allow sampling of the temperature of the bulk content within the sample container. The receptacle can be centrally located on the cap and/or the container body to allow the sample container to maintain a substantially axially symmetric shape. An axially symmetric shape can allow the sample container to be used, for example, in a centrifuge. In some embodiments, the receptacle can have a beveled edge or tapered portion to help guide insertion of a sensor (e.g., a temperature probe or sensor) into a desired position within the receptacle.

Figure 1:
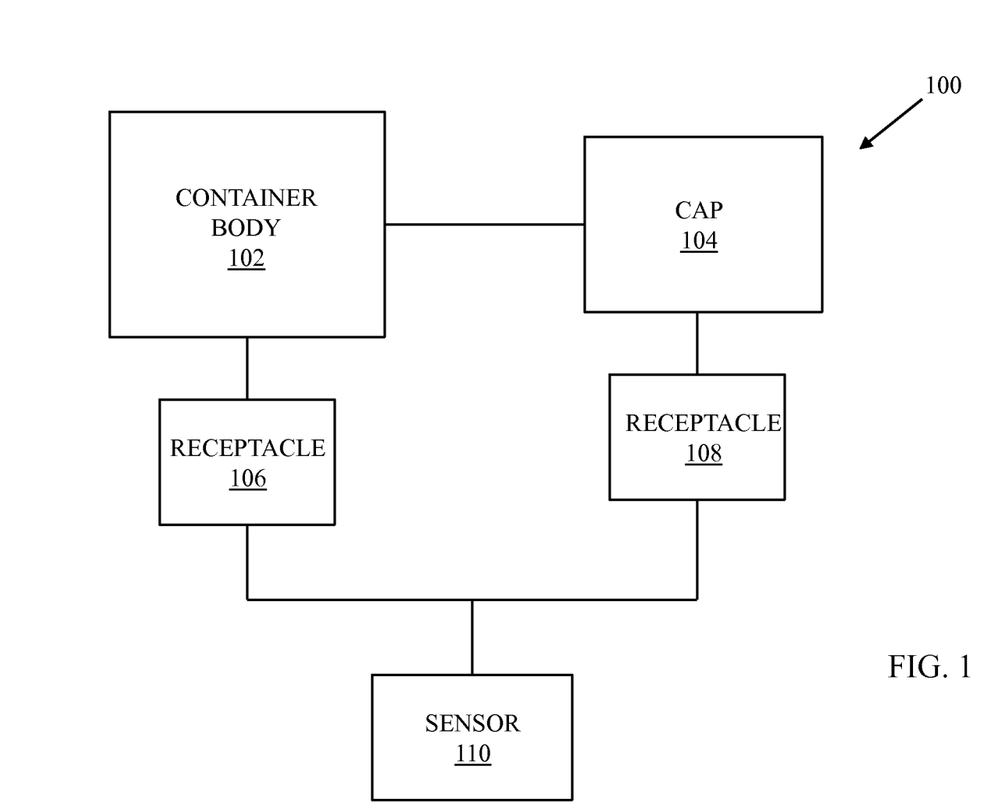
FIG. 1 is a schematic illustration of a sample container according to an embodiment.

FIG. 1 is a schematic illustration of a sample container according to an embodiment. A sample container 100 includes a container body 102 and a cap 104 that can be sealingly engaged or coupled to the container body 102. For example, in some embodiments, the cap 104 can be coupled to the container body 102 with a threaded coupling, a snap closure, or with a friction fit. In some embodiments, a seal or gasket can be disposed between a portion of the cap 104 and the container body 104 to provide an air-tight fit. In some embodiments, the cap 104 can be fixedly attached to the container body 102 with, for example, a hinge to allow the cap 104 to be opened and closed relative to the container body 102. In some embodiments, the cap 104 is removably coupled to the container body 102.

The container body 102 can define an opening and an interior volume in fluid communication (e.g., a fluid, such as, a gas or a liquid, can pass between the opening and the interior volume) that can receive therein a sample or test material (e.g., PCR reaction agent(s)). The interior volume of the container body 102 can be, for example, in the range of about 25 microliters to about 2000 microliters. The container body 102 can have a variety of different shapes and sizes. For example, in some embodiments, the container body 102 can have an internal conical shape, which can help guide sample material to the center base of the container body 102. In some embodiments, the container body 102 can also have an external conical shape conical shape to match the internal conical shape. In some embodiments, the container body 102 can have an external shape that includes a flat or substantially flat bottom such that the container body 102 can stand alone on a flat surface.

The container body 102 can be formed with various suitable thermally conductive materials, such as, for example, various metals or plastics, such as, for example, polypropylene, polyethylene, or polystyrene. Other thermally conductive materials that provide sufficient structural stability and inertness can also be used. The material used to form the container body 102 should be free of contaminating metals that might interfere with, for example, PCR reactions, and other impurities that might alter molecular biology processes. The container body 102 should also be constructed to enable the container body 102 to be exposed to temperatures from liquid nitrogen storage (−196° C.), ultra low temperature freezers (−86° C.), standard freezers, refrigerators, room temperature, incubators, and thermal cyclers (100° C.). The container body 102 should also be formed to enable exposure to a variety of chemical reagents including, for example, acids and bases, oxidizing and reducing agents, organic solvents, teratogenic and mutagenic agents, electrolytes and buffer solutions. The container body 102 should also be formed with a material to allow for the container body 102 to be exposed to, for example, up to about 14,000 g force in laboratory centrifuges.

The cap 104 can also be formed with a variety of different chemically inert materials, such as, for example, various metals or plastics, such as, for example, polypropylene, polyethylene, or polystyrene. In some embodiments, the cap 104 can be formed so as to allow for the transmission therethrough of electromagnetic radiation, such as in the visible or ultraviolet portions of the spectrum. Such an embodiment can allow for the use of the sample container 100 in, for example, fluorescent PCR applications and microplate reader applications.

The sample container 100 can be used to perform a variety of different laboratory procedures, such as, for example, a PCR procedure to amplify and detect DNA within a sample material. In some procedures, such as a PCR procedure, the temperature of the sample material is monitored at various time periods or cycles during the process. Some PCR procedures include a thermal or heat flow analysis to detect amplified DNA. Examples of such a thermal PCR procedure are described in U.S. Patent Application Pub. No. 2009/0220984 to Dinges, entitled "Heat Flow Polymerase Chain Reaction Systems and Methods" (the '984 publication), the disclosure of which is hereby incorporated by reference herein in its entirety. The sample container 100 can be used in such PCR procedures as well as other laboratory procedures.

To measure the temperature of a sample material disposed within the interior volume of the container body 102 before, during and/or after a laboratory procedure, the container body 102 can include a receptacle 106 extending into the container body 102 from a bottom surface of the container body 102 and/or the cap 104 can include a receptacle 108 extending from a top surface of the cap 104 and into the container body 102. The receptacles 106 and 108 can receive a sensor 110 therein. The sensor 110 can be, for example, a temperature probe or sensor, such as a thermocouple. The receptacle 106 can be formed integrally or monolithically with the container body 102 or can be formed as a separate component coupled to the container body 102. Similarly, the receptacle 108 can be formed integrally or monolithically with the cap 104 or can be a separate component coupled to the cap 104.

The receptacle 106 and/or the receptacle 108 can extend within the interior volume of the container body 102 such that a distal end portion of a sensor 110 can be disposed within the receptacle 106 or 108 at a desired location within the container body 104. For example, the receptacles 106 and 108 can have an open end for insertion of a sensor 110 and extend a desired length or depth to a closed end located within the container body 102. In some embodiments, a length of the receptacle 106 or 108 is such that the receptacle 108 or 110 has a closed end disposed at a central or substantially central location within the container body 102. Such a configuration can allow a sensor 110 to be inserted into the bulk of the sample contents within the container body 102 without actually contacting the sample contents. The receptacles 106 and/or 108 can have a length or depth that can allow a distal end portion of a sensor 110 to be situated at the thermal center of the sample material within the container body 102. The depth or length of the receptacle 106 and/or 108 can be optimized to accommodate the shape and size of the container body 102, and the sample material to be tested.

The receptacles 106 and 108 can have a variety of different cross-sectional shapes, such as, for example, round or tubular, square, rectangular, triangular, ellipsoidal, or other shape to accommodate different shapes of sensors 110. The receptacles 106 and 108 can also have a variety of different diameters or widths. For example, the receptacles 106 and 108 can have a diameter or width that is optimized to accommodate a diameter or width of a particular sensor 110 (e.g., temperature sensor). The receptacles 106 and 108 can be centrally located (e.g., at a center point of the cap 104 or a center point of a bottom surface of the container body 102) such that the sample container 100 can maintain a substantially axially symmetric shape. Such an axially symmetric shape can allow the sample container 100 to be used, for example, in a centrifuge.

The receptacles 106 and 108 can have an aspect ratio defined by a ratio of a length (or depth) to diameter (or width) of the receptacle 106 and 108 such that the receptacle 106 and 108 is just sufficiently wide (e.g., diameter or width) to receive a sensor 110 therein, but sufficiently long (e.g., length or depth) such that a distal end portion of the sensor 110 can extend to a substantially central portion of the container body 102. Thus, the receptacles 106 and 108 can be relatively long and narrow without causing a detrimental reduction in the size of the interior volume of the container body 102. For example, in some embodiments, the receptacle 106 and/or 108 can have a length to width (e.g., diameter) aspect ratio of at least 1.5:1. In some embodiments, the aspect ratio can be, for example, 1.5:1, 2:1, 2.5:1, 3:1, 3.5:1, 4:1, 4.5:1, 5:1, 6:1, 6.5:1, 7:1, 7.5:1, 8:1, 8.5:1, 9:1, 9.5:1, 10:1, 20:1, or an aspect ratio between 10:1 and 20:1 or any other aspect ratio in the range of 1.5:1 to 20:1.

The receptacle 106 and/or the receptacle 108 can be formed with the same or different material as the container body 102 and/or the cap 104. In some embodiments, it may be desirable to construct the receptacle 106 and/or receptacle 108 from a more thermally conductive material than the respective container body 102 or cap 104. In some embodiments, a thickness of the walls of the receptacles 106 and 108 can be thinner than a thickness of the respective container body 102 or cap 104 to provide for greater thermal conductivity, while maintaining structural integrity. The walls of the receptacles 106 and 108 can allow heat to be conducted to a temperature sensor 110 disposed with the receptacle 106 or 108, while maintaining separation of the sample material within the container body 102 from the sensor 110.

The receptacles 106 and 108 can also include a beveled or tapered portion at its open end. The tapered portion can be help guide insertion of a sensor 110 (e.g., a temperature sensor) and guide a distal end portion of the sensor 110 to a desired location within the receptacle 108 or 110. For example, the distal end of a sensor 110 can be guided to a central position within the container body 102. The degree of beveling or taper can be varied to best fit the particular application.

In some embodiments, the sample container 100 includes a container body 102 that includes an array of multiple container body portions (not shown in FIG. 1) each defining an interior volume that can contain a sample material, and a cap 104 with an array of multiple cap portions (not shown in FIG. 1) that can be sealingly engaged with corresponding container body portions. In such an embodiment, each of the container body portions can include a receptacle 106 and/or each of the cap portions can include a receptacle 108. The receptacles 106 and 108 can each receive therein a sensor 110 as described above. In some embodiments, the container body 102 includes an array of multiple container body portions arranged in a row and the cap 102 includes a corresponding row of cap portions. In some embodiments, the sample body 102 includes an array of multiple container body portions arranged on a plate with a matrix of rows and columns of container body portions, and the cap 104 includes a corresponding arrayed plate of cap portions. Examples of such embodiments are described in more detail below.

Having described above some of the features and functions of a sample container, various specific embodiments of a sample container are described herein. Although each feature and function of each component of the sample containers described herein may not be specifically discussed below with reference to specific embodiments, it should be understood that the various components of a sample container can be formed the same as or similar to, and function the same as or similar to, the embodiments described above.

Figure 2:
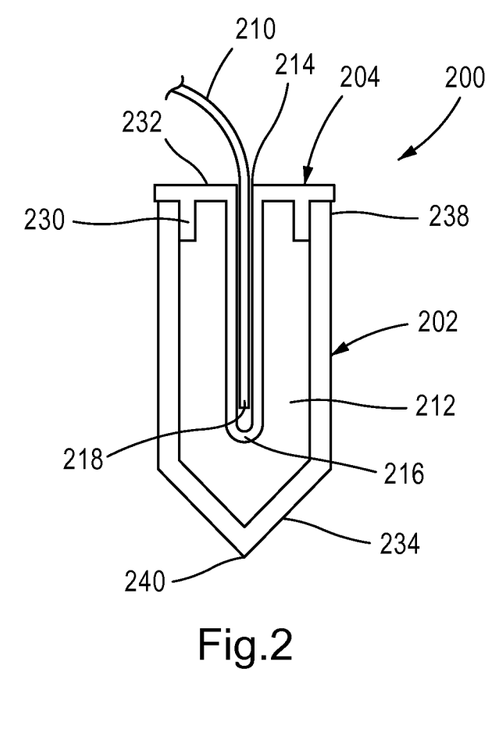
FIG. 2 is a side cross-sectional view of a sample container according to an embodiment, shown with a sensor disposed within a receptacle in a cap of the sample container.
Figure 3:
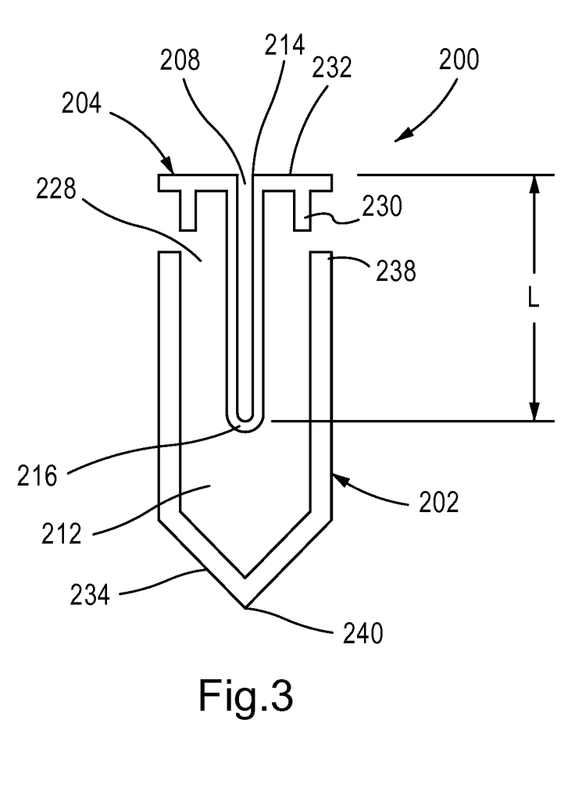
FIG. 3 is an exploded view of the sample container of FIG. 2.
Figure 4:
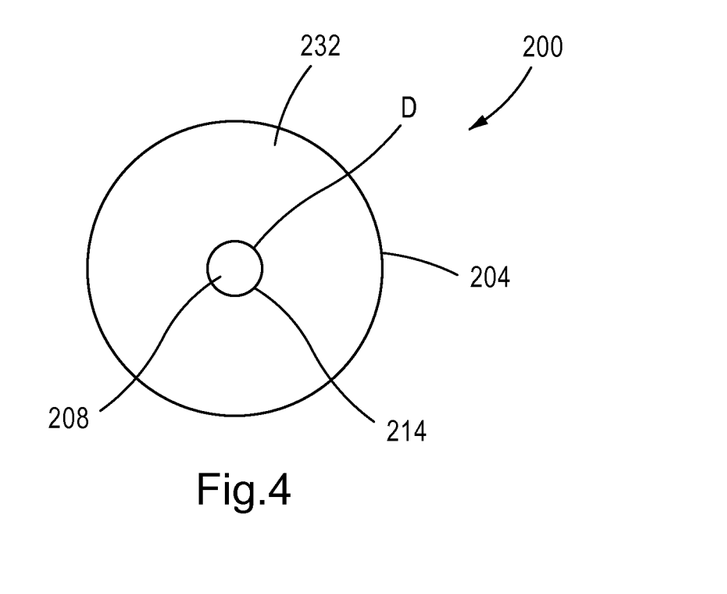
FIG. 4 is a top view of the sample container of FIG. 2.

FIGS. 2-4 illustrate a sample container according to an embodiment. A sample container 200 includes a container body 202 and a cap 204. The container body 202 has a first end 238 that defines an opening 228 in fluid communication with an interior volume 212, which can receive therein a sample material to be tested during a laboratory procedure. The container body 202 also includes a second end 240 and a conical shaped bottom portion 234. The cap 204 includes an annular flange 230 that can be received within the opening 228 and the cap 204 can be sealingly engageable to the container body 202. For example, the flange 230 can form a friction fit to an inner wall of the container body 202. The cap 204 can alternatively be coupled to the container body 202 with a variety of different coupling methods as described above for sample container 100. In this embodiment, the cap 204 includes a receptacle 208 that can receive therein a sensor 210 (e.g., a temperature sensor). As shown in FIG. 4, the receptacle 208 is centrally located on a top surface 232 of the cap 204 such that the sample container 200 can maintain a symmetrical shape.

The receptacle 208 has an open end 214 accessible at the top surface 232 of the cap 204, and a closed end 216. The receptacle 208 has a length L that extends from the open end 214 to the closed end 216 (as shown in FIG. 3), and a diameter D (as shown in FIG. 4). As described above, the receptacle 208 can have an aspect ratio defined by a ratio of its length L to its diameter D. In some embodiments, the aspect ratio can be, for example, of at least 1.5:1. As shown in FIG. 2, the sensor 210 can be inserted through the open end 214 of the receptacle 208 and a distal end portion 218 of the sensor 210 can be disposed at a desired location within the receptacle 208. For example, the sensor 210 can be disposed within the receptacle 208 such that its distal end portion 218 is disposed at a substantially thermal center of the sample material within the container body 202. This allows the temperature of the sample material to be monitored during a laboratory procedure without exposing the sensor 210 to the sample material and without having to rely on a surface temperature taken on an exterior surface of the container body 202.

Figure 5:
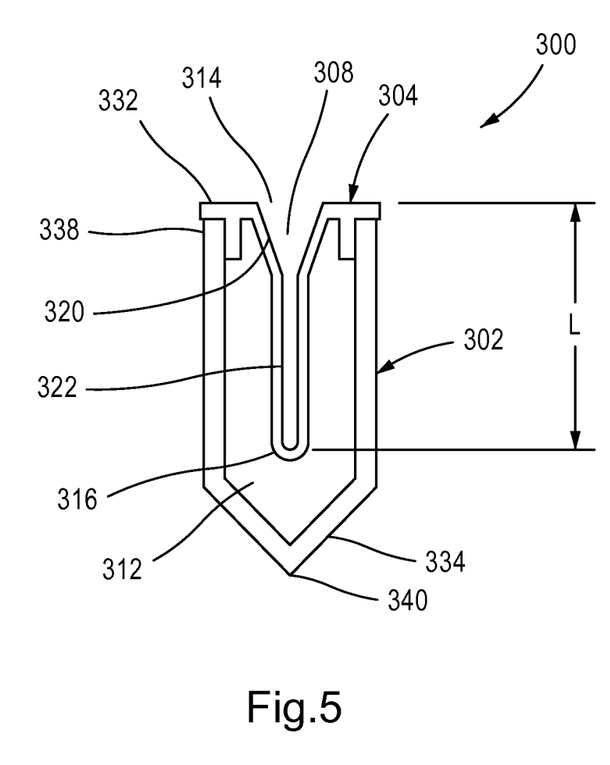
FIG. 5 is a side cross-sectional view of a sample container according to another embodiment having a receptacle within the cap of the sample container.
Figure 6:
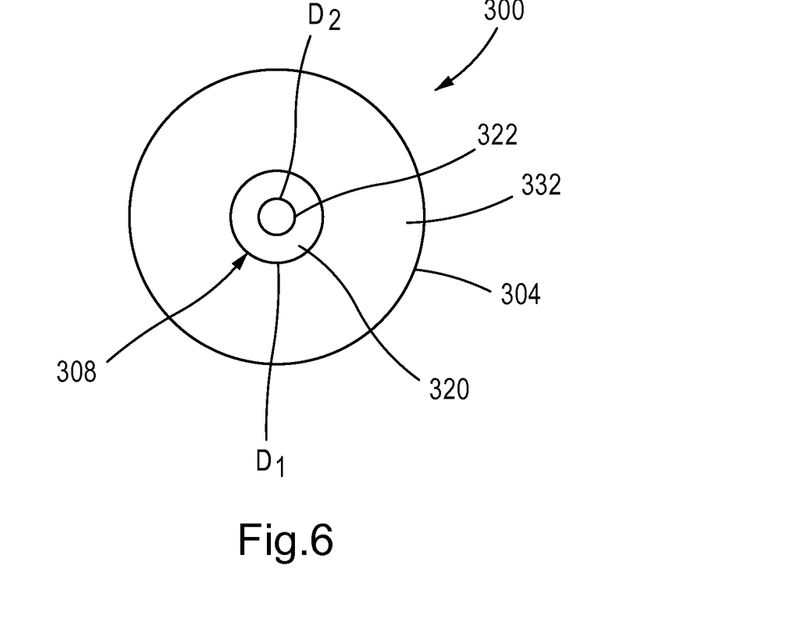
FIG. 6 is a top view of the sample container of FIG. 5.

FIGS. 5 and 6 illustrate another embodiment of a sample container having a receptacle in the cap. A sample container 300 includes a container body 302 and a cap 304 sealingly engageable to the container body 302. The container body 302 includes a first end 338 that defines an opening (not shown in FIGS. 5 and 6) in fluid communication with an interior volume 312 that can receive therein a sample material, and a second end 340 and a conical shaped bottom portion 334. The cap 304 can be coupled to the container body 302 with a variety of different coupling methods as described above. The cap 304 includes a receptacle 308 that is centrally located on a top surface 332 of the cap 304 (see e.g., FIG. 6) and that can receive therein a sensor (e.g., a temperature sensor) (not shown in FIGS. 5 and 6).

The receptacle 308 has an open end 314 and a closed end 316 and has a length L that extends from the open end 314 to the closed end 316 (as shown in FIG. 5). In this embodiment, the receptacle 308 has a tapered portion 320 having a diameter D1 defined at the open end 314 and a substantially constant diameter portion 322 having a diameter D2. The tapered portion 320 tapers or narrows from the diameter D1 to the diameter D2 (e.g., D1 is greater than D2). As described above, the tapered portion 320 can aid in the insertion of a sensor into the receptacle 308 and can help guide a distal end portion of the sensor to a desired location within the receptacle 308. For example, a sensor can be inserted through the open end 314 of the receptacle 308 and a distal end portion of the sensor can be disposed at a desired location within the substantially constant diameter portion 322 of the receptacle 308. In this embodiment, the receptacle 308 can have an aspect ratio defined by a ratio of its length L to its diameter D2. In some embodiments, the aspect ratio can be, for example, at least 1.5:1.

Figure 7A:
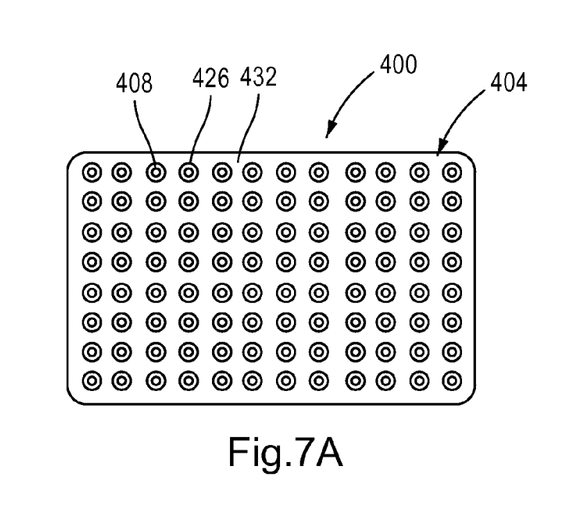
FIG. 7A is a top view of a cap that includes multiple cap portions of a sample container according to an embodiment.
Figure 7B:
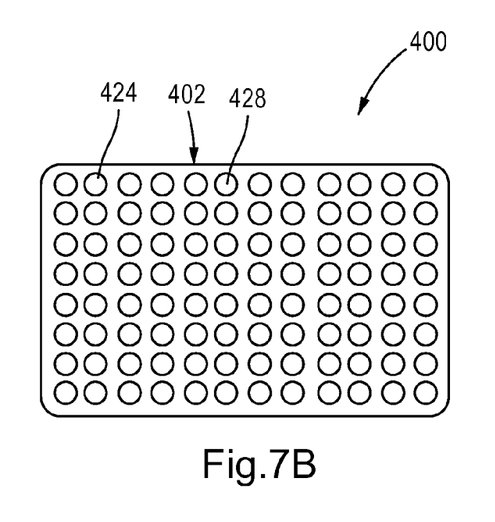
FIG. 7B is a top view of a container body of the sample container of FIG. 7A having multiple container body portions.
Figure 7C:
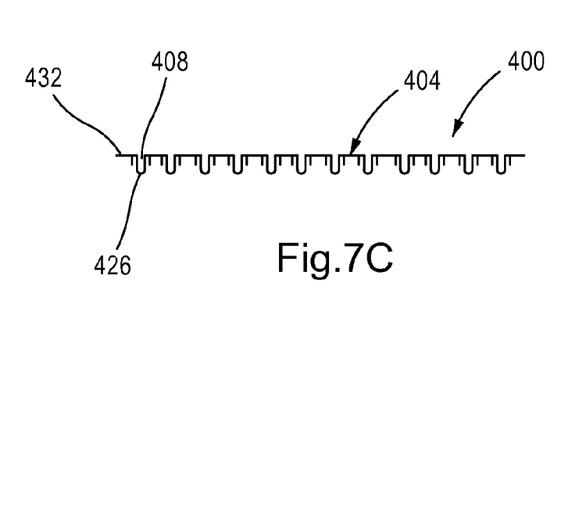
FIG. 7C is a side cross-sectional view of the cap of FIG. 7A
Figure 7D:
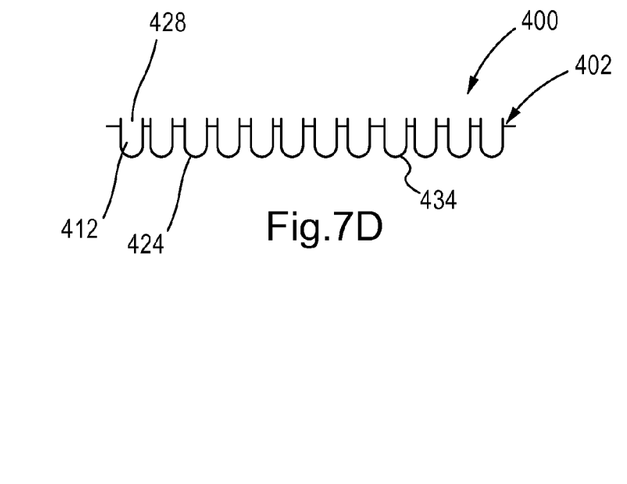
FIG. 7D is a side cross-sectional view of the container body of FIG. 7B.

FIGS. 7A-7D illustrate another embodiment of a sample container that includes a cap that has a receptacle for receiving a sensor. In this embodiment, the sample container includes an arrayed plate configuration. A sample container 400 includes a container body 402 and a cap 404. In this embodiment, as shown in FIGS. 7B and 7D, the container body 402 has a plate configuration and includes an array of multiple container body portions 424 each defining a top opening 428 in fluid communication with an interior volume 412 that can receive a sample material therein. As shown in FIGS. 7A and 7C, the cap 404 has a plate configuration and includes an array of multiple cap portions 426 each configured to be sealingly engaged or coupled to a corresponding container body portion 424 and each cap portion 426 includes a receptacle 408. The receptacles 408 can each receive therein a sensor (not shown), such as a temperature sensor, and can be sized and shaped as described above for previous embodiments (e.g., receptacles 208, 308). The receptacles 408 can also be sized such that the receptacles 408 have a length to diameter aspect ratio of at least 1.5:1 as described above for previous embodiments.

Figure 8:
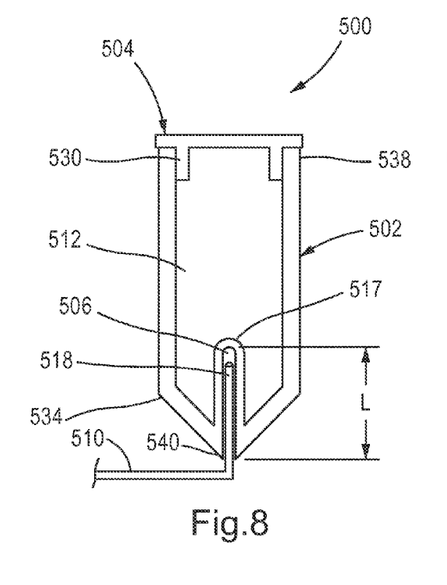
FIG. 8 is a side cross-sectional view of a sample container according to an embodiment having a receptacle in the container body of the sample container.
Figure 9:
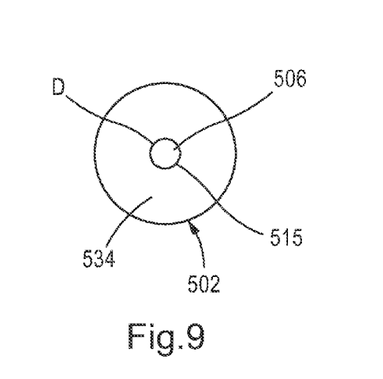
FIG. 9 is a bottom view of the sample container of FIG. 8.

FIGS. 8 and 9 illustrate an embodiment of a sample container that has a receptacle disposed within the container body. A sample container 500 includes a container body 502 and a cap 504. As with previous embodiments, the container body 502 includes a first end 538 that defines a top opening (not shown in FIGS. 8 and 9) in fluid communication with an interior volume 512 that can receive therein a sample material to be tested during a laboratory procedure. The container body 502 also includes a second end 540 and a conical shaped bottom portion 534. The cap 504 includes an annular flange 530 that can be received within the top opening of the container body 502 and the cap 504 can be sealingly engageable to the container body 502 as described above. In this embodiment, the container body 502 includes a receptacle 506 that can receive therein a sensor 510 (e.g., a temperature sensor) as shown in FIG. 8. As shown in FIG. 9, the receptacle 506 is centrally located on the bottom portion 534 of the container body 502 such that the sample container 500 can maintain a symmetrical shape.

The receptacle 506 has an open end 515 accessible at the bottom portion 534 of the container body 502, and a closed end 517. The receptacle 506 has a length L that extends from the open end 515 to the closed end 517 (as shown in FIG. 8), and a diameter D (as shown in FIG. 9). As described above, the receptacle 506 can have an aspect ratio defined by a ratio of its length L to its diameter D. In some embodiments, the aspect ratio can be, for example, at least 1.5:1. As shown in FIG. 8, the sensor 510 can be inserted through the open end 515 of the receptacle 506 and a distal end portion 518 of the sensor 510 can be disposed at a desired location within the receptacle 506. For example, the sensor 510 can be disposed within the receptacle 506 such that its distal end portion 518 is disposed at a substantially thermal center of the sample material within the container body 502. As with previous embodiments, this allows the temperature of the sample material to be monitored during a laboratory procedure without exposing the sensor 510 to the sample material and without having to rely on a surface temperature taken on an exterior surface of the container body 502.

Figure 10:
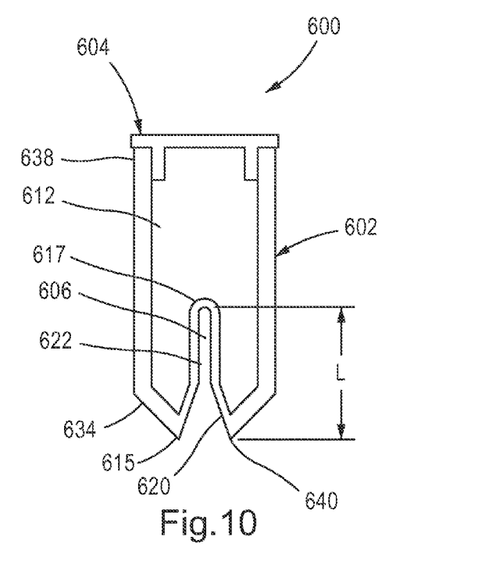
FIG. 10 is a side cross-sectional view of a sample container according to another embodiment having a receptacle in the container body of the sample container.
Figure 11:
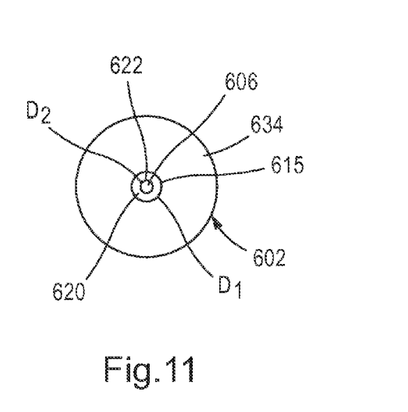
FIG. 11 is a bottom view of the sample container of FIG. 10.

FIGS. 10 and 11 illustrate another embodiment of a sample container having a receptacle in the container body. A sample container 600 includes a container body 602 and a cap 604 sealingly engageable to the container body 602. The container body 602 includes a first end 638 that defines a top opening (not shown in FIGS. 10 and 11) in fluid communication with an interior volume 612 that can receive therein a sample material, and a second end 640 and a conical shaped bottom portion 634. The cap 604 can be coupled to the container body 602 with a variety of different coupling methods as described above. As with the previous embodiment, the container body 602 includes a receptacle 606 that is centrally located on the bottom portion 634 of the container body 602, as shown in FIG. 11, and that can receive therein a sensor (e.g., a temperature sensor) (not shown in FIGS. 10 and 11).

The receptacle 606 has an open end 615 and a closed end 617 and has a length L that extends from the open end 615 to the closed end 617 as shown in FIG. 10. In this embodiment, the receptacle 606 has a tapered portion 620 having a diameter D1 defined at the open end 615 and a substantially constant diameter portion 622 having a diameter D2. The tapered portion 620 tapers or narrows from the diameter D1 to the diameter D2 (e.g., D1 is greater than D2). As described above, the tapered portion 620 can aid in the insertion of a sensor into the receptacle 606 and can help guide a distal end portion of the sensor to a desired location within the receptacle 606. For example, a sensor can be inserted through the open end 615 of the receptacle 606 and a distal end portion of the sensor can be disposed at a desired location within the substantially constant diameter portion 622 of the receptacle 606. In this embodiment, the receptacle 606 can have an aspect ratio defined by a ratio of its length L to its diameter D2. In some embodiments, the aspect ratio can be, for example, at least 1.5:1.

Figure 12:
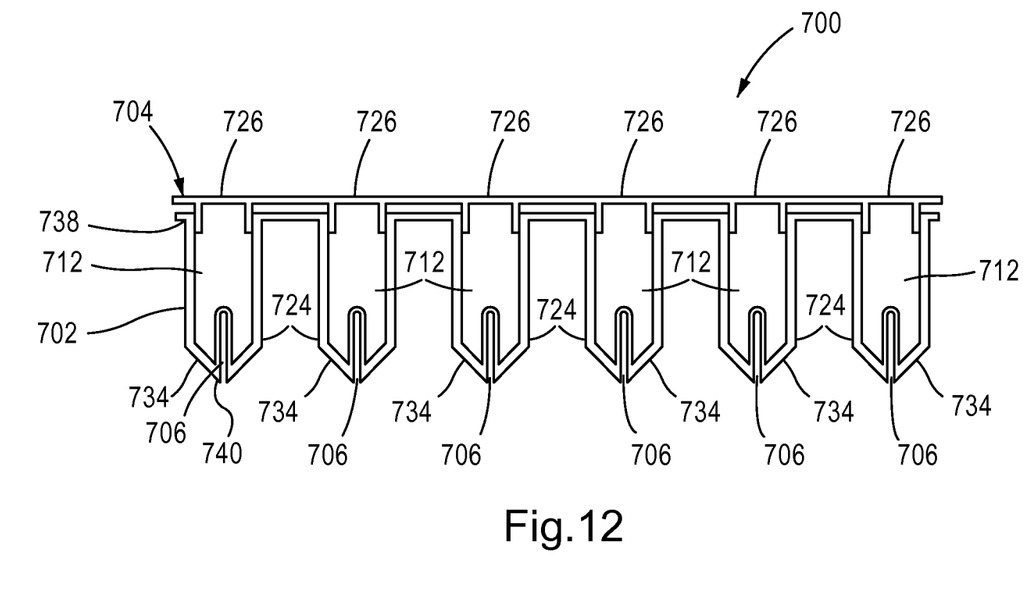
FIG. 12 is a side cross-sectional view of an embodiment of a sample container including a cap with multiple cap portions and a container body having multiple container body portions each having a receptacle for receiving a sensor.

FIG. 12 illustrates another embodiment of a sample container that includes a container body that has a receptacle for receiving a sensor. In this embodiment, the sample container includes a row of container portions. A sample container 700 includes a container body 702 and a cap 704. In this embodiment, the container body 702 a row of multiple container body portions 724 each defining an interior volume 712 that can receive a sample material therein and an opening (not shown) defined at a first end 738 in fluid communication with the interior volume 712. Each of the container body portions 724 have a second end 740, a conical shaped bottom portion 734, and include a receptacle 706 extending from the second end 740 toward the first end 738. The receptacles 706 can each receive therein a sensor (not shown), such as a temperature sensor, and can be sized and shaped as described above for previous embodiments.

Figure 13:
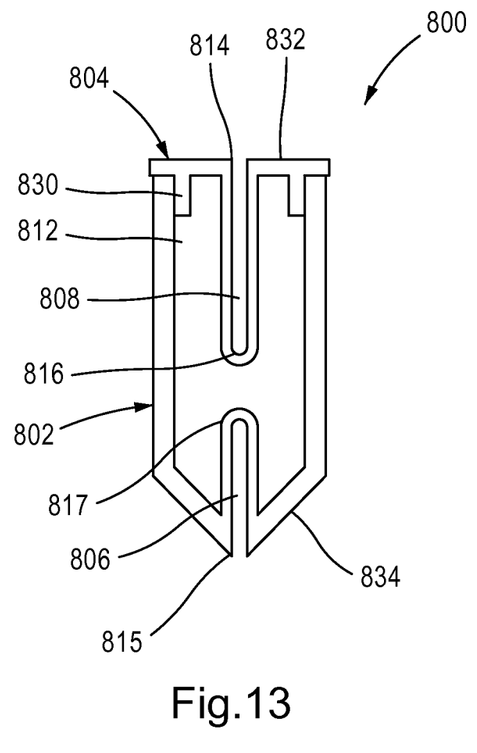
FIG. 13 is side cross-sectional view of a sample container according to another embodiment that includes a receptacle in both the cap and container body of the sample container.

FIG. 13 illustrates an embodiment of a sample container that includes a receptacle in both the container body and the cap. A sample container 800 includes a container body 802 and a cap 804. The container body 802 defines a top opening in fluid communication with an interior volume 812 that can receive therein a sample material, and has a conical shaped bottom portion 834. The cap 804 includes an annular flange 830 that can be received within the top opening of the container body 802 and the cap 804 can be sealingly engageable to the container body 802 using a variety of different coupling methods as described above. In this embodiment, the cap 804 includes a receptacle 808 that can receive therein a sensor (not shown) and the container body 802 includes a receptacle 806 that can also receive a sensor (not shown) therein. The receptacle 808 can be centrally located on a top surface 832 of the cap 804 and the receptacle 806 can be centrally located on a bottom portion 834 of the container body 802, as described above for previous embodiments. Thus, in this embodiment, a sensor can be inserted in either the receptacle 808 or the receptacle 806, or both.

The receptacle 808 has an open end 814 accessible at the top surface 832 of the cap 804, and a closed end 816. The receptacle 808 has a length that extends from the open end 814 to the closed end 816 and a diameter sized for receiving a sensor therein. As described above, the receptacle 808 can have an aspect ratio defined by a ratio of its length to its diameter of, for example, at least 1.5:1. As with previous embodiments, a sensor can be inserted through the open end 814 of the receptacle 808 and a distal end portion of the sensor can be disposed at a desired location within the receptacle 808.

The receptacle 806 has an open end 815 accessible at the bottom portion 834 of the container body 802, and a closed end 817. The receptacle 806 has a length that extends from the open end 815 to the closed end 817 and a diameter sized to receive a sensor therein. As described above, the receptacle 806 can have an aspect ratio defined by a ratio of its length to its diameter. In some embodiments, the aspect ratio can be, for example, at least 1.5:1. A sensor can be inserted through the open end 815 of the receptacle 806 and a distal end portion of the sensor can be disposed at a desired location within the receptacle 806.

Figure 14:
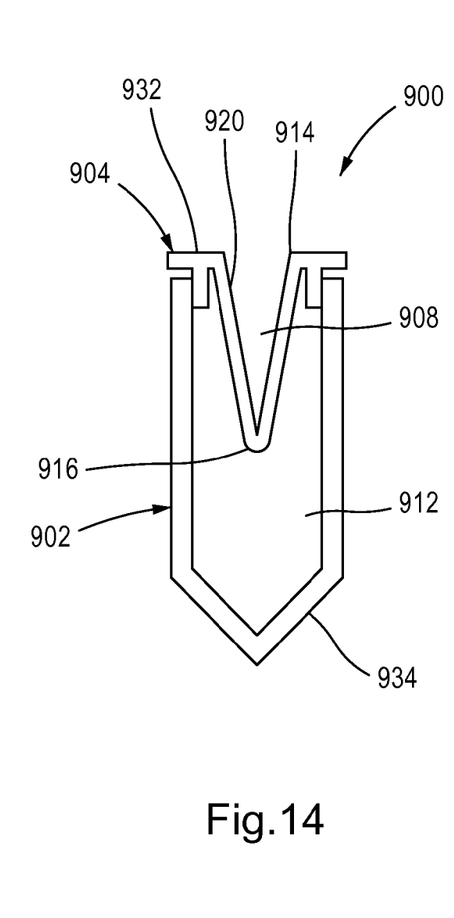
FIG. 14 is side cross-sectional view of a sample container according to another embodiment that includes a receptacle in the cap of the sample container.

FIG. 14 illustrates another embodiment of a sample container having a receptacle in the cap. A sample container 900 includes a container body 902 and a cap 904 sealingly engageable to the container body 902. The container body 902 defines a top opening (not shown in FIG. 14) in fluid communication with an interior volume 912 that can receive therein a sample material, and a conical shaped bottom portion 934. The cap 904 can be coupled to the container body 902 with a variety of different coupling methods as described above. The cap 904 includes a receptacle 908 that can be centrally located on a top surface 932 of the cap 904, and that can receive therein a sensor (e.g., a temperature sensor), as described above for previous embodiments.

The receptacle 908 has an open end 914 and a closed end 916 and has a length that extends from the open end 914 to the closed end 916. In this embodiment, the receptacle 908 has a tapered portion 920 that extends the length of the receptacle 908. In other words, the receptacle 908 has a diameter that varies along its length. The tapered portion 920 tapers or narrows from a diameter defined at the top surface 932 or open end 914 of the cap 904 to a diameter defined at the closed end 916. As described above, the tapered portion 920 can aid in the insertion of a sensor into the receptacle 908 and can help guide a distal end portion of the sensor to a desired location within the receptacle 908.

Figure 15:
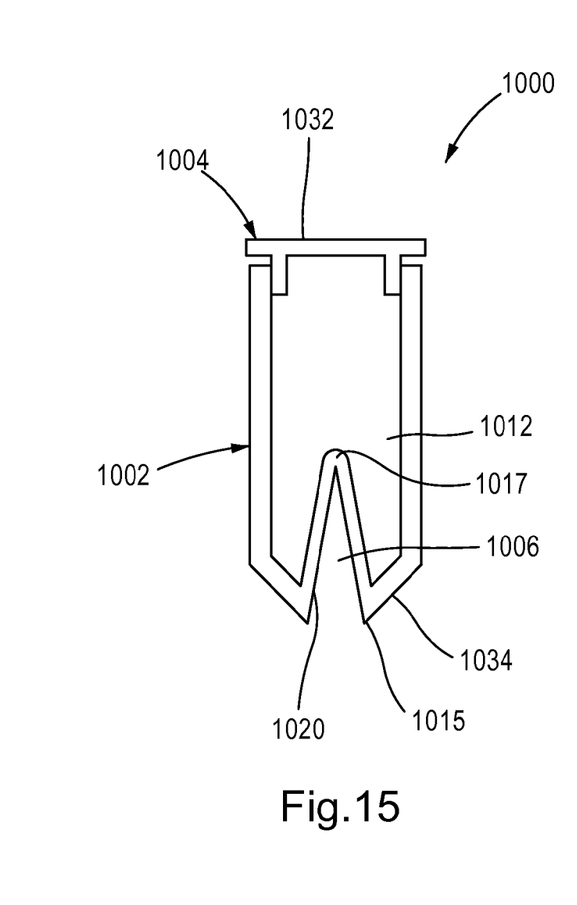
FIG. 15 is a side cross-sectional view of a sample container according to another embodiment that includes a receptacle in the container body of the sample container.

FIG. 15 illustrates another embodiment of a sample container having a receptacle in the container body. A sample container 1000 includes a container body 1002 and a cap 1004 sealingly engageable to the container body 1002. The container body 1002 defines a top opening (not shown in FIG. 15) in fluid communication with an interior volume 1012 that can receive therein a sample material, and a conical shaped bottom portion 1034. The cap 1004 can be coupled to the container body 1002 with a variety of different coupling methods as described above for previous embodiments. In this embodiment, the container body 1002 includes a receptacle 1006 that can be centrally located on the bottom portion 1034 of the container body 1002, and that can receive therein a sensor (e.g., a temperature sensor) (not shown in FIG. 15).

The receptacle 1006 has an open end 1015 and a closed end 1017 and has a length that extends from the open end 1015 to the closed end 1017. In this embodiment, the receptacle 1006 has a tapered portion 1020 that extends the length of the receptacle 1006. In other words, the receptacle 1006 has a diameter that varies along its length. The tapered portion 1020 tapers or narrows from a diameter defined at the bottom portion 1034 or open end 1015 of the container body 1002 to a diameter defined at the closed end 1017. As described above, the tapered portion 1020 can aid in the insertion of a sensor into the receptacle 1006 and can help guide a distal end portion of the sensor to a desired location within the receptacle 1006.

Figure 16:
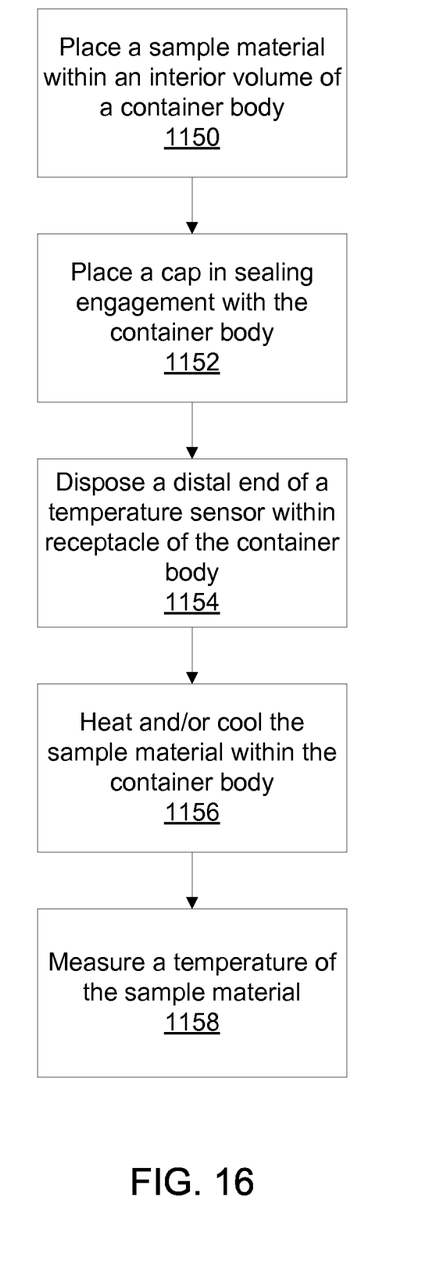
FIG. 16 is a flowchart illustrating a method for a procedure to measure a temperature of a sample material disposed within a sample container.

FIG. 16 illustrates a method of measuring a temperature of a sample material according to an embodiment. The method includes at 1150, placing a sample material within an interior volume of a container body where the container body has a first end that defines an opening in fluid communication with the interior volume and a second end opposite the first end that defines a receptacle extending towards the first end. At 1152, a cap is placed in sealing engagement with the first end of the container body. At 1154, a distal end of a temperature sensor is disposed within the receptacle of the container body. The temperature sensor can be disposed within the receptacle before or after the cap has been placed in sealing engagement with the container body. At 1156, the sample material can be heated and/or cooled within the interior volume of the container body. At 1158, a temperature of the sample material within the interior volume of the container body is measured using the temperature sensor. In some embodiments, the cap can also include a receptacle that can receive a sensor. In such an embodiment, a distal end of another sensor, such as, another temperature sensor, can be disposed within the receptacle of the cap. A temperature of the sample material (or some other measurement depending on the sensor) can be measured with the sensor disposed in the receptacle of the cap.

Figure 17:
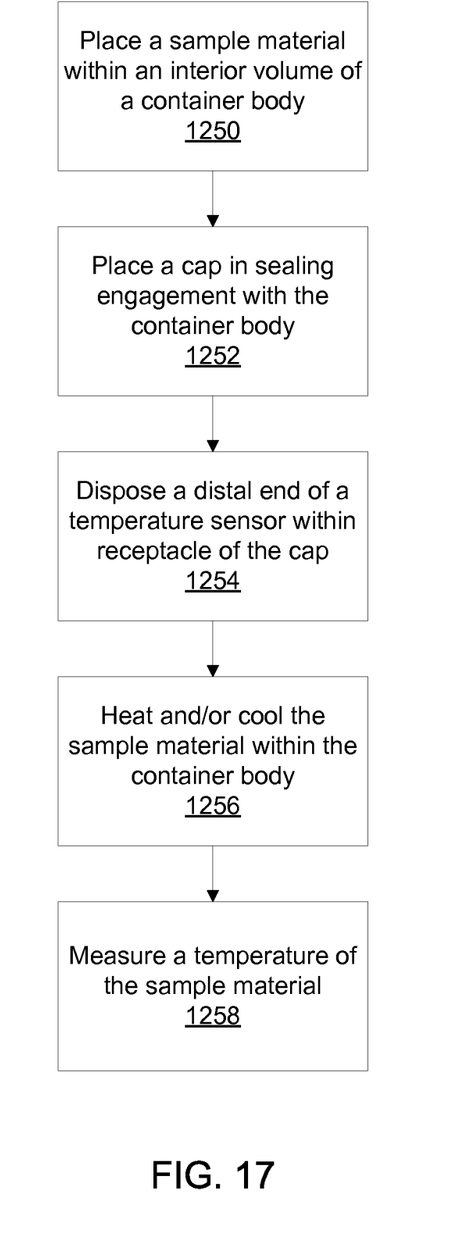
FIG. 17 is a flowchart illustrating another method for a procedure to measure a temperature of a sample material disposed within a sample container.

FIG. 17 illustrates a method of measuring a temperature of a sample material according to an embodiment. The method includes at 1250, placing a sample material within an interior volume of a container body where the container body has a first end that defines an opening in fluid communication with the interior volume and a second end opposite the first end. At 1252, a cap is placed in sealing engagement with the first end of the container body. The cap includes a receptacle extending towards the second end of the container body when the cap is coupled to the container body. At 1254, a distal end of a temperature sensor is disposed within the receptacle of the cap. The temperature sensor can be disposed within the receptacle before or after the cap has been placed in sealing engagement with the container body. At 1256, the sample material can be heated and/or cooled within the interior volume of the container body. At 1258, a temperature of the sample material within the interior volume of the container body is measured using the temperature sensor. In some embodiments, the container body can also include a receptacle that can receive a sensor. In such an embodiment, a distal end of another sensor, such as, another temperature sensor, can be disposed within the receptacle of the container body. A temperature of the sample material (or some other measurement depending on the sensor) can be measured with the sensor disposed in the receptacle of the container body.

CONCLUSION

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although the embodiment of FIGS. 7A-7D illustrates a plate configuration having multiple container body portions and multiple cap portions, with the cap portions including a receptacle, in other embodiments, a sample container can include a plate configuration with multiple container body portions, each having a receptacle or both the cap portions and the container body portions can include a receptacle as described herein. In another example, the sample container described with respect to FIG. 12 can alternatively include a row of multiple container body portions and multiple cap portions, with the cap portions each including a receptacle.

The specific configurations of the various components can also be varied. For example, the size and specific shape of the various components can be different than the embodiments shown, while still providing the functions as described herein. For example, the specific length and diameter of the receptacles can be varied to accommodate different sizes of sensors and/or to accommodate a particular test procedure.

What is claimed is:

1. A sample container, comprising:
  a container body defining an interior volume and having a first end defining an opening in fluid communication with the interior volume and a second end opposite the first end, the second end of the container body defining a receptacle extending towards the first end,
  the receptacle having a closed end, an open end, a tapered portion at the open end configured to guide insertion of a temperature sensor into the receptacle and a substantially constant diameter portion between the tapered portion and the closed end.

2. The sample container of claim 1, wherein the interior volume is a first interior volume, the opening is a first opening, the receptacle being a first receptacle, the container body defining a second interior volume, a second opening in fluid communication with the second interior volume, and a second receptacle, the sample container further comprising:
  a cap including a first cap portion and a second cap portion, the first cap portion being sealingly enagageable with the first opening of the container body, the second cap portion being sealingly engageable with the second opening of the container body.

3. The sample container of claim 1, wherein the container body is formed with a thermally conductive material.

4. The sample container of claim 1, further comprising:
  a temperature sensor configured to be received within the receptacle.

5. The sample container of claim 1, wherein the closed end of the receptacle is disposed at substantially a center point of the interior region of the container body.

6. The sample container of claim 1, wherein the substantially constant diameter portion of the receptacle has an aspect ratio defined by a ratio of a length to a width of an inner diameter of the substantially constant diameter portion of the receptacle of at least 1.5:1.

7. The sample container of claim 1, wherein the substantially constant diameter portion of the receptacle has a first length and the tapered portion has a second length substantially the same as the first length.

\* \* \* \* \*